United States Patent
Jenkines

(10) Patent No.: US 6,555,199 B1
(45) Date of Patent: Apr. 29, 2003

(54) CARPET BACKING PRECOATS, LAMINATE COATS, AND FOAM COATS PREPARED FROM POLYURETHANE FORMULATIONS INCLUDING FLY ASH

(75) Inventor: Randall C. Jenkines, Dalton, GA (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/579,605

(22) Filed: May 26, 2000

Related U.S. Application Data

(63) Continuation-in-part of application No. 08/703,158, filed on Aug. 28, 1996, now Pat. No. 6,096,401.

(51) Int. Cl.⁷ .................. B32B 33/00; C08G 18/00; D05C 17/02
(52) U.S. Cl. .................. 428/97; 428/95; 428/96; 521/101; 521/159
(58) Field of Search .................. 428/95, 96, 97, 428/160, 304.4, 316.6, 317.1, 317.5, 317.7; 521/159, 106, 101

(56) References Cited

U.S. PATENT DOCUMENTS

| | | | |
|---|---|---|---|
| 3,669,913 A | * | 6/1972 | Morehouse .................. 516/76 |
| 3,755,212 A | | 8/1973 | Dunlap et al. |
| 3,821,130 A | | 6/1974 | Barron et al. |
| 3,849,156 A | | 11/1974 | Marlin et al. |
| 3,862,879 A | | 1/1975 | Barron et al. |
| 3,959,191 A | * | 5/1976 | Kehr et al. .................. 428/304.4 |
| 4,022,941 A | | 5/1977 | Prokai et al. |
| 4,096,303 A | | 6/1978 | Doerfling |
| 4,171,395 A | | 10/1979 | Tollotson |
| 4,241,131 A | | 12/1980 | Bailey |
| 4,278,482 A | | 7/1981 | Poteet et al. |
| 4,286,003 A | | 8/1981 | Higgins et al |
| 4,296,159 A | | 10/1981 | Jenkines et al. |
| 4,405,393 A | | 9/1983 | Tillotson |
| 4,483,894 A | | 11/1984 | Porter et al. |
| 4,512,831 A | | 4/1985 | Tillotson |
| 4,515,646 A | | 5/1985 | Walker et al. |
| 4,595,436 A | | 6/1986 | Walker et al. |
| 4,611,044 A | | 9/1986 | Meyer et al. |
| 4,657,790 A | | 4/1987 | Wing et al. |
| 4,661,533 A | | 4/1987 | Stobby |
| 4,696,849 A | | 9/1987 | Mobley et al. |
| 4,734,455 A | * | 3/1988 | Mobley et al. .................. 524/710 |
| 4,853,054 A | | 8/1989 | Turner et al. |
| 4,853,280 A | | 8/1989 | Piteet |
| 4,892,891 A | | 1/1990 | Close |
| 5,104,693 A | | 4/1992 | Jenkines |
| 5,302,634 A | | 4/1994 | Mushovic |
| 5,565,497 A | | 10/1996 | Godbey et al. |
| 5,646,195 A | | 7/1997 | Mobley |
| 5,723,194 A | * | 3/1998 | Rosthauser et al. .................. 428/423.1 |
| 6,271,276 B1 | * | 8/2001 | Gribble et al. .................. 264/48 |

FOREIGN PATENT DOCUMENTS

| | | |
|---|---|---|
| CA | 1071349 | 7/1975 |
| EP | 0 093 392 A1 | 4/1983 |
| EP | 0 309 816 A3 | 9/1988 |
| EP | 0 309 816 A2 | 9/1988 |

* cited by examiner

*Primary Examiner*—Cheryl A. Juska
(74) *Attorney, Agent, or Firm*—Locke Liddell & Sapp LLP

(57) ABSTRACT

The present invention is a polyurethane carpet backing prepared from a polyurethane-forming composition wherein fly ash is included as a filler material. High loadings of fly ash can be obtained without detriment to the process for preparing a polyurethane carpet backing, or adverse effect to the physical properties of the carpet backing.

32 Claims, No Drawings

CARPET BACKING PRECOATS, LAMINATE COATS, AND FOAM COATS PREPARED FROM POLYURETHANE FORMULATIONS INCLUDING FLY ASH

This application is a continuation-in-part application of U.S. patent application Ser. No. 08/703,158, filed Aug. 28, 1996, now U.S. Pat. No. 6,096,401.

BACKGROUND OF THE INVENTION

The present invention relates to polyurethane-backed articles. The present invention particularly relates to polyurethane-backed articles and to a process and composition used in making same.

Articles having attached polyurethane foam layers are well known. For example, carpets and other substrates having attached polyurethane foam layers as backing are described in U.S. Pat. Nos.: 3,755,212; 3,821,130; 3,862,879; 4,022,941; 4,171,395; 4,278,482; 4,286,003; 4,296,159; 4,405,393; 4,483,894; 4,512,831; 4,515,646; 4,595,436; 4,611,044; 4,657,790; 4,696,849; 4,853,054; 4,853,280 and, 5,104,693. Typically a filler material is used to prepare a polyurethane formulation for carpet backing. The filler can replace some of the polymer required to prepare a polyurethane backed article, while maintaining bulk in the article. This can lower the cost of production of the article, since materials used as fillers are typically less expensive than the polymer material that is being replaced.

In selecting a filler for a particular application, the effect that the filler can have on the process—and on the physical properties of the article—should be considered. For example, in a process for preparing polyurethane backed carpets, a filler that is too alkaline can cause premature gellation. Conversely, a filler that is too acidic can cause an unacceptable delay in the onset of gellation. Increasing the amount of conventional fillers used in preparing carpet backing, such as calcium carbonate ($CaCO_3$) and aluminum trihydrate (ATH), can result in an undesirable viscosity increase in a polyurethane formulation.

While cost reduction can be an incentive for introducing as much filler as possible into a polyurethane formulation, it can be unacceptable to reduce the cost of production at the expense of the quality of the article produced. The amount of filler incorporated into a polyurethane formulation can be limited by the adverse effects that the filler can have on the properties of a polyurethane, such as flexibility, resiliency, and adhesion, for example.

Fly ash has been used as a filler material in systems such as cement and concrete products, roadbases/subbases, and structural fills. See, for example, U.S. Department of Transportation/Federal Highway Administration Report No. FHWA-SA-94-081 (August 1995). The Electric Power Research Institute (EPRI), in EPRI Report CS-4765 (September 1986) (hereinafter CS-4765), reported that fly ash recovered from a direct acid leaching process was added as a filler to polymerized nylon and polypropylene.

It would be desirable to increase the loading of filler into a polyurethane formulation without detriment to the process of preparing a polyurethane carpet backing, or to the final physical properties of the final product. It would also be desirable to use fly ash as a filler material in a reactive polymeric system without significant effect on a polymer forming reaction.

SUMMARY OF THE INVENTION

In one aspect, the present invention is a polyurethane-forming composition, useful for preparing a polyurethane precoat, polyurethane laminate coat, or polyurethane foam coat comprising a polyol; a chain extender; a polyisocyanate; a catalyst; a surfactant; a filler wetting agent; and a filler, wherein the filler includes fly ash; and optionally including a surfactant and a blowing agent.

In another aspect, the present invention is a backed carpet having a polyurethane backing that includes at least one coat of polyurethane that is prepared from a polyurethane-forming composition comprising a polyol; a chain extender; a polyisocyanate; a catalyst; a filler wetting agent; a filler, wherein the filler includes fly ash; and optionally including a surfactant and a blowing agent.

In still another aspect, the present invention is a process for preparing a carpet having a polyurethane backing comprising the steps: (1) applying at least one layer of a polyurethane-forming composition to a carpet substrate, wherein the polyurethane-forming composition includes fly ash; and (2) curing the polyurethane-forming composition to form a tack-free polyurethane backing. Applicant has developed a process for preparing a polyurethane composition which incorporates fly ash as a filler material. The process of the present invention can result in an improved process, including increased flow of a polyurethane composition into the backstitch of a carpet, and increased pot life of a polyurethane composition. The use of fly ash as filler reduces pilling and fuzzing of the carpet face, improves flexibility of the carpet during installation, and also reduces puddle gellation during application of a polyurethane-forming composition. In addition, fly ash can be included at a higher loading than conventional fillers, without detriment to established process parameters or to the physical properties of a polyurethane carpet backing.

DESCRIPTION OF THE PREFERRED EMBODIMENTS

The polyurethane-forming composition of the present invention comprises a polyol as described herein, a chain extender, a polyisocyanate, a catalyst as described herein, a surfactant, a filler wetting agent, and a filler that includes fly ash. The composition of the present invention contains reactive components such as active hydrogen containing compounds and compounds having isocyanate functionality.

Active hydrogen containing compounds are compounds having active hydrogen functionality, wherein at least one hydrogen atom is bonded to an electronegative atom such as sulfur, nitrogen, or oxygen. Active hydrogen containing compounds described herein can contain any combination of hydroxyl, amino, and mercaptyl functionality—in addition to other active hydrogen groups—and can be reacted with isocyanate groups under conditions suitable for preparing a polyurethane carpet backing. The average functionality of an active hydrogen containing compound refers to the average number of active hydrogen groups per compound.

A polyol is an example of an active hydrogen containing compound, in the present invention. As used herein, the term "polyol" can refer to a single polyol or to a mixture of two or more polyols. A polyol of the present invention can have an average equivalent weight of from about 500 to about 5000, preferably from about 750 to about 2500, and more preferably from about 750 to about 2000. The average equivalent weight of a compound can be determined by dividing the average molecular weight of the compound by the functionality of the compound. In the present invention, at least about 30 percent, preferably about 50 percent, and more preferably about 60 percent of the hydroxyl functionality of a polyol is primary hydroxyl functionality. While a wide range of materials can be used, polyether polyols are preferred based on their performance and wide availability. Polymers of propylene oxide which are at least partially end-capped with ethylene oxide are particularly preferred.

Polyols of the present invention are prepared by known methods by reacting an alkylene oxide with a suitable polyhydric initiator compound. The alkylene oxide preferably has 2–8 carbon atoms. For example suitable alkylene oxides can be ethylene oxide, propylene oxide, 1,2-butylene oxide, 2,3-butylene oxide, styrene oxide, epichlorohydrin, 3-methyl-1,2-butylene oxide, like compounds and mixtures thereof, with propylene oxide being the preferred oxide. The initiator compound can be a polyhydric compound such as water, ethylene glycol, propylene glycol, 1,2-butane diol, 1,3-butane diol, glycerine, trimethylol propane, p,p'-isopropylidine diphenol, aniline, ammonia, ethylene diamine, aminoethylethanolamine, like compounds and mixtures thereof.

When a single polyol is used in the present invention, the polyol can have an average functionality of from about 1.4 to about 3.0. Preferably the average functionality of the polyol is from about 1.6 to about 2.8. A mixture of polyols can be used which includes at least a second polyol in addition to the first polyol. The second polyol can be described in the same manner as the first polyol except that the second polyol can have a functionality of at least about 2.05. Preferably, the second polyol has a functionality of from about 2.4 to about 3.0, more preferably the functionality is from about 2.5 to about 2.95. When a polyol mixture is used, the average functionality of the polyol mixture can be from about 1.97 to about 2.5, preferably from about 1.98 to about 2.4 and more preferably from about a 1.99 to about 2.3.

The present invention optionally includes a chain extender. A chain extender is typically a low equivalent weight active hydrogen containing compound having about 2 active hydrogen groups per molecule. The active hydrogen groups can be hydroxyl, mercaptyl, or amino groups. If the active hydrogen groups are amino groups then the amine is preferably a sterically hindered amine. A sterically hindered amine is an amine that is substituted with bulky groups that tend to inhibit the reactivity of the amine, for example alkyl groups having 2 or more carbons. An amine chain extender can also be blocked, encapsulated, or otherwise rendered less reactive. Preferred chain extenders include glycols and glycol ethers such as: ethylene glycol; 1,4-butane diol; 1,6-hexamethylene glycol; dipropylene glycol; tripropylene glycol; diethylene glycol; triethylene glycol; cyclohexanedimethanol; the diverse bisphenols; like compounds and mixtures thereof. Suitable amine chain extenders include: methylene bis(o-chloroaniline); NaCl-blocked methylene dianiline; diethyltoluenediamine; like compounds, and mixtures thereof.

In preparing a polyurethane backing of the present invention, small amounts of chain extender are advantageously used. Generally, from about 5 to about 50 parts, preferably from about 5 to about 30 parts of the chain extender per 100 parts of polyol, by weight, are used. More preferably from about 5 to about 20 parts of chain extender per 100 parts of polyol are used in the practice of the present invention.

The polyurethane-forming composition of the present invention also includes a polyisocyanate. The average functionality of a polyisocyanate is the average number of isocyanate groups per molecule. The polyisocyanate used herein has an average functionality of from about 1.9 to about 3.0. The polyisocyanate preferably has an average functionality of about 1.95 to about 2.5, and more preferably from about 1.95 to about 2.4. Most preferably, the polyisocyanate has an average functionality of from about 2.0 to about 2.4.

The polyisocyanate can be aliphatic or aromatic. Aromatic polyisocyanates suitable for use herein include: phenyl diisocyanate; 2,4-toluene diisocyanate; 2,6-toluene diisocyanate; ditoluene diisocyanate; naphthalene 1,4-diisocyanate; 2,4'- and/or 4,4'-diphenylmethane diisocyanate (MDI); polymethylene polyphenylenepolyisocyanates (polymeric MDI); like compounds, and mixtures thereof. Suitable aliphatic polyisocyanates include: the hydrogenated derivatives of suitable aromatic polyisocyanates such as 1,6-hexamethylene diisocyanate; isophorone diisocyanate; 1,4-cyclohexyl diisocyanate; like compounds and mixtures thereof. Prepolymers prepared by reacting a polyol or chain extender with a polyisocyanate are suitable, as well.

The polyisocyanate can be used in an amount suitable to prepare a polyurethane-forming composition with an isocyanate index of from about 85 to about 130. The isocyanate index can be calculated by multiplying the ratio of isocyanate equivalents to active hydrogen equivalents by 100. The preferred isocyanate index is a variable that depends on the amount of water in the textile. Preferably the isocyanate index is in the range of from about 85 to about 115 for a laminate coat, and preferably from about 85 to about 110 for a foam coat.

A catalyst is used in the practice of the present invention. Suitable catalysts include tertiary amines, and organometallic compounds, like compounds and mixtures thereof. For example, suitable catalysts include di-n-butyl tin bis (mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, like compounds and mixtures thereof. An amount of catalyst is advantageously employed such that a relatively rapid cure to a tack-free state is obtained. If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

The present invention includes a filler material. The filler material includes fly ash. The filler can be exclusively fly ash, or it can optionally include conventional fillers such as milled glass, calcium carbonate, ATH, talc, bentonite, antimony trioxide, kaolin, or other known fillers. Preferably, fly ash makes up at least 50 percent by total weight of the filler used in the present invention. More preferably, fly ash makes up at least 75 percent of the filler, and even more preferably at least 90 percent of the filler used in the present invention. Most preferably fly ash makes up substantially all of the filler material, i.e. at least 99 percent of the filler is fly ash.

Fly ash is a residue that results from the combustion of pulverized coal, and can include various proportions of oxides of silicon (Si), aluminum (Al), iron (Fe), calcium (Ca), and magnesium (Mg). The major portion of fly ash is composed of oxides of aluminum and silicon. Fly ash can be classified as either Class C or Class F type fly ash. Class C fly ash is obtained from subbituminous and lignite coals. Class F fly ash is obtained from bituminous and anthracite coals. The fly ash of the present invention is Class F fly ash. The fly ash used in the present invention can be treated according to known processes to remove impurities or undesirable components. For example, fly ash can be treated by water washing. Alternatively, fly ash can be treated by direct acid leaching (DAL) as described in CS-4765. As another alternative, fly ash suitable for use with the present invention can be purchased commercially.

Fly ash can be included in a formulation of the present invention at a higher loading than can be obtained using conventional fillers. Fly ash can be loaded at greater than 400 parts of fly ash per 100 parts of active hydrogen compounds. Conventional fillers loaded at greater than 400 parts per 100 parts can cause problems in a process for preparing a polyurethane carpet backing. For example, conventional fillers can cause an unacceptable viscosity increase in a polyurethane-forming formulation when included at a concentration of greater than 400 parts. For the purposes of the present invention, filler can be loaded into a precoat or laminate coat at a concentration of from about 100 to about 1000 parts of filler per 100 parts of active hydrogen containing compounds. Preferably the filler is loaded at a concentration of from about 300 to about 900 parts per 100 parts. More preferably the filler is loaded at a concentration of from about 300 to about 700 parts per 100 parts of active hydrogen containing compounds. In a foam coat, filler can be loaded at a concentration of from about 100 to about 400 parts of filler per 100 parts of active hydrogen containing compounds. Preferably, filler is loaded at from about 150 to 400 parts, more preferably from about 200 to about 400 parts.

The present invention also includes a filler wetting agent. A filler wetting agent generally performs the function of compatiblizing the filler and the polyurethane-forming composition. Useful filler wetting agents can include ethoxylated phosphate esters in an organic carrier. Examples of suitable filler wetting agents include Maphos™ 56, Pegafax™ 410, and Code 5027 (available from Fibro Chem, Inc.). Other useful filler wetting agents could include sodium lauryl sulfate, oleoylsarcosine, cocoamide, and triisopropanolamine stearate.

A filler wetting agent can be included in a polyurethane-forming composition of the present invention at a concentration of at least about 0.5 parts per 100 parts of filler, by weight. Preferably the filler wetting agent is included at a concentration of from about 0.5 to about 1.5 parts per 100 parts of filler, more preferably from about 0.75 to about 1.25 parts per 100 parts of filler.

The present invention can include other optional components. For example, a polyurethane-forming composition of the present invention can include a surfactant, a blowing agent, a flame retardant, pigments, antistatic agents, reinforcing fibers, antioxidants, preservatives, water scavengers, acid scavengers, and the like. Examples of suitable blowing agents include gases such as air carbon dioxide, nitrogen, argon, helium, and the like; liquids such as water, volatile halogenated alkanes such as the various chlorfluoromethanes and chlorfluoroethanes; azo-blowing agents such as azobis(formamide). Preferred in the practice of this invention is the use of a gas as a blowing agent. Particularly preferable is the use of air as a blowing agent.

A surfactant can be desirable in the present invention. A surfactant can be particularly useful in preparing a polyurethane foam coat, or a polyurethane laminate coat using a composition of the present invention. Suitable surfactants include block copolymers of ethylene oxide and silicone surfactants. For example, suitable block copolymers of ethylene oxide include copolymers having at least 60 weight percent of the polymer being derived from oxyethylene units, 15 to 40 weight percent of the polymer being derived from polydimethylsiloxane units, and the polymer having a molecular weight of less than 30,000, as described in U.S. Pat. No. 4,483,894. A surfactant can be included in a formulation of the present invention in an amount ranging from about 0.01 to about 2 parts per 100 parts by weight of polyol.

Backed carpets can include a precoat and a laminate coat applied to the back of a carpet substrate. In addition, a backed carpet can optionally include an attached foam cushion that is applied to the carpet substrate. Generally, carpets having attached cushions are prepared by tufting or weaving yarn into a primary backing, applying an adhesive precoat to the primary backing to bind the tufted material into the backing, and then applying a polyurethane foam cushion. Use of any of the polyurethane coats can be optional in the practice of the present invention. For example, application of a separate polyurethane precoat can be eliminated by application of a sufficient amount of a laminate coat, such that the laminate coat soaks into the carpet weave and performs the function of both a precoat and a laminate coat. Similarly, a polyurethane foam coat can be applied in an amount sufficient to eliminate separate application of a polyurethane precoat and/or laminate coat.

Use of a precoat layer is preferred because use of a precoat allows greater flexibility in the processing conditions used in preparing a polyurethane backed carpet. For example, use of a precoat allows use of higher functionality in a polyurethane laminate coat composition. Higher functionality tends to have a detrimental effect on the physical properties of a carpet. A precoat layer can prevent a subsequent laminate coat or foam coat from penetrating the carpet weave, thereby enabling use of a laminate or foam coat having higher functionality without detriment to carpet properties.

In preparing polyurethane-backed carpets according to this invention, the individual components of the polyurethane-forming composition are mixed and applied as a layer of preferably uniform thickness onto one surface of the carpet substrate. It is often preferable to pre-mix all components except the polyisocyanate (and optional blowing agent, when a gas is used) to form a formulated "B-side". This simplifies the metering and mixing at the time the polyurethane-forming composition is prepared. In preparing a frothed polyurethane backing, it is preferred to mix all components and then blend a gas into the mixture, using equipment such as an Oakes or Firestone roamer.

The polyurethane-forming composition is then applied to one surface of a carpet substrate before it cures to a tack-free state. Typically the polyurethane-forming composition is applied to the surface attached to a primary backing. The composition may be applied to the carpet substrate before any substantial curing occurs, using equipment such as a doctor knife, air knife, or extruder to apply and gauge the layer. Alternatively, the composition may be formed into a layer on a moving belt or other suitable apparatus and partially cured, then married to the carpet substrate using equipment such as a double belt (also known as double band) laminator or a moving belt with an applied foam cushion. The amount of polyurethane-forming composition used can vary widely, from about 5 to about 500 ounces per square yard, depending on the characteristics of the textile. After the layer is applied and gauged, the layer is cured using heat from any suitable heat source such as an infrared oven, a convection oven, or heating plates. A temperature of from 100° C. to about 170° C., and a time of from about 1 minute to about 60 minutes are suitable for curing the polyurethane.

The polyurethane-forming composition of the present invention can be used to coat a variety of substrates. For example the composition of the present invention can be used to coat textiles such as: broadloom carpet; carpet tile; automotive carpet; fabrics for automotive trim; paneling and trunk liners; synthetic playing surfaces; tennis ball covers; drapery fabrics; wall-covering fabric; woven and non-woven scrim and the like.

EXAMPLES

The following examples and comparative example are meant to be illustrative of the present invention. These examples and comparative example are not intended to limit the scope of the claims of the present invention and they should not be interpreted in that manner.

Example 1

Precoat

A 2000 molecular weight polyether diol (A) is prepared by reacting dipropylene glycol with propylene oxide to a molecular weight of about 1760, followed by reaction with ethylene oxide to a molecular weight of about 2000. 85 grams of component A is mixed with 15 grams of dipropylene glycol, 400 grams of fly ash (AlSil™, JTM grade O1TR), and 4 grams of Code 5027 filler wetting agent. A 23 weight percent isocyanate prepolymer (B) is prepared by reacting a dipropylene/tripropylene glycol mixture (45/55 weight percent) with an equal weight of diphenylmethane 4,4'-diisocyanate. A 27.5 weight percent isocyanate prepolymer (B') mixture is prepared by adding a 2.3 functional polyisocyanate to component B. 59.5 grams of component B' and 0.15 grams of dibutyltin sulfide is added to component A and the components thoroughly mixed. The resulting precoat blend is applied to a commercial grade loop nylon carpet having a woven polypropylene primary backing (Sea Island) with a blade over roll applicator (i.e. doctored) at a rate of 30 ounces per square yard (opsy). The carpet is cured for eight (8) minutes in an oven maintained at 120° C. A mechanical froth as described in U.S. Pat. No. 5,104,693 is doctored onto the precoated carpet. A non-woven polyester scrim, as described in U.S. Pat. No. 4,853,280 (Style NO. 2117 from Hoechst Fiber), is placed onto the surface of the uncured froth. The resulting composite is cured for an additional eight (8) minutes at 120° C. The carpet backing is tested for Edge Curl, Edge Ravel, and Tuft Bind as described below. The results of the testing are recorded in Table 1.
Tuft Bind
Tuft Bind is determined according to ASTM D-1335.
Edge Curl
Submerge three 2"×6" pieces of carpet in room temperature water for 30 seconds. Wring the excess water from the carpet. Place the samples on a flat surface with the backing side down. Weight down the samples at the first 2" of the end opposite the end to be measured. Set a timer for 30 minutes and leave the samples undisturbed for the duration of the timer setting. After 30 minutes measure the distance from the flat surface to the backing side of the outer edges of each piece.
Edge Ravel
The Edge Ravel test is conducted using an Instron. Die cut three 2"×6" carpet samples (1 each from left, right and center of carpet, cut left and right samples no closer than 1" from the edge of the carpet). Condition the samples for at least 24 hours at 23° C. ±3° C., 50% humidity, ±5%. Prepare the samples by pulling out two complete tuft rows. This can be accomplished using needle nose pliers. Trim any excess primary backing, foam, or scrim away from the third tuft row with scissors. Start pulling the next tuft row approximately 1.5 to 2 inches of total yarn length along the prepared length. Mount the tension load cell (set at either 100 or 10 lbs.) and allow the cell to warm up for 10 minutes. Install the pneumatic jaws on the Instron. Check the crosshead levers to insure that they are in their proper positions. The right lever should be pushed to the rear and the left lever should be pulled toward the front of the machine. Operate the Instron according to the manufacturer's instructions, setting the maximum extension at a setting of 8 and the speed at a setting of 10. Place the test specimen in the lower jaw of the Instron with the prepared edge facing upwards. Secure the partially unraveled tuft row in the upper jaw. Start the test by pressing the UP button on the control panel. Record the results.

Example 2

Comparative Precoat Example

The procedure of Example 1 is followed, except 215 parts of ATH is used instead of fly ash, and 1.5 parts of Code 5027 filler wetting agent is used instead of 4 parts. The carpet was tested for edge curl, edge ravel, and tuft bind. The results are recorded in Table 1.

Example 3

Laminate Coat Prepared With Scrim

The precoat blend of Example 1 is used with the following exceptions: 65.0 parts of component B' per 100 parts of polyol are included; a blowing agent (water, 0.5 parts per 100 parts of polyol) is included; and, a surfactant (Niax™ L-5614, 0.75 parts per 100 parts of polyol) is included. The formulation is mechanically frothed to a density of 1200 g/ml, and the froth is applied to Sea Island at a rate of 49 opsy. A non-woven polyester scrim, as described in U.S. Pat. No. 4,853,280 (Style NO. 2117 from Hoechst Fiber), is placed onto the surface of the uncured froth. The carpet composite is cured in an oven for 3.5 minutes at 120° C. The scrim is flattened onto the laminate with a smooth roller (regauged) according to a procedure described in U.S. Pat. No. 4,278,482. The carpet sample is cured for an additional 4.0 minutes at 120° C. The laminate is tested for tuft bind, edge ravel and edge curl. The results are reported in Table 1.

Example 4

Laminate Prepared With a Scrim

A laminate coat is applied to the same carpet substrate according to the procedure of Example 3. The laminate blend is prepared as in Example 3 except diethylene glycol chain extender is used instead of dipropylene glycol. The results are recorded in Table 1.

TABLE 1

| EXAMPLE NO. | 1 | 2[A] | 3 | 4 |
|---|---|---|---|---|
| Carpet Style | Sea Island | Sea Island | Sea Island | Sea Island |
| Tuft Bind (lbs) | 11.5/10.9 | 13.3/10.7 | 11 | 14 |
| Edge Ravel (lbs) | 2.0/3.7 | 2.1/2.1 | 0.8 | 1.8 |
| Edge curl (cm) | 0/0 | 0/0 | 0.01 | 0.02 |

[A]Not an example of the present invention.

Example 5

Foam Coat

A foam coat is prepared using 90 parts of a polyol (Voranol® 9741), 10 parts of diethylene glycol chain extender per 100 parts of polyol, 220 parts of fly ash filler (AlSil, JTM grade O1TR) per 100 parts of polyol, Code 5027 filler wetting agent (0.5 part per 100 parts of filler), Isonate® 7045 isocyanate (41.5 parts per 100 parts of polyol) dibutyltin sulfide catalyst (0.15 parts per 100 parts of polyol), and Niax L-5614 surfactant (0.75 parts per 100 parts of polyol).

Example 6

Viscosity of Compounds Containing Fly Ash Filler

The compound viscosity data are obtained using the following procedure. A stock polyol blend is prepared with 85 parts per hundred parts of Voranol® 9120 polyol, 15 parts per hundred parts of dipropylene glycol chain extender, and 1 part per hundred parts of water. A filler wetting agent and a filler are added to the polyol in varying amounts (see Table 2). The components are mixed to 120° F., then cooled to 72° F. The viscosity of the mixtures are determined using a #7 spindle rotating at 10 rpm on a Brookfield viscometer model RVTDV-II. The results are recorded in Table 2.

TABLE 2

| Filler | ATH (H36U)[a] | | CaCO$_3$ (D70)[a] | | | | AlSil (O1TR) | | |
|---|---|---|---|---|---|---|---|---|---|
| Loading | 200 | 300 | 200 | 300 | 200 | 300 | 400 | 400 | 400 |
| Temperature (° F.) | 72 | 72 | 72 | 72 | 72 | 72 | 72 | 82 | 92 |
| Viscosity (cps) | 7200 | 19600 | 7600 | 30800 | 3600 | 10400 | 22400 | 14000 | 11600 |

[a]Not an example of the present invention.

What is claimed is:

1. A polyurethane-forming composition useful for preparing a polyurethane precoat, polyurethane laminate coat, or polyurethane foam coat comprising:
   (a) a polyol;
   (b) a chain extender;
   (c) a polyisocyanate;
   (d) a catalyst;
   (e) a filler wetting agent; and
   (f) a filler, wherein the filler includes Class F fly ash.

2. The polyurethane-forming composition of claim 1 wherein the composition additionally includes:
   (1) a surfactant; and
   (2) a blowing agent.

3. The polyurethane-forming composition of claim 1 wherein the polyol has an average functionality of from about 1.4 to about 3.0.

4. The polyurethane-forming composition of claim 1 wherein the polyol has an average functionality of from about 1.6 to about 2.8.

5. The polyurethane-forming composition of claim 1 wherein the polyol is a mixture of two or more polyols.

6. The polyurethane-forming composition of claim 5 wherein the polyol mixture has an average functionality of from about 1.97 to about 2.5.

7. The polyurethane-forming composition of claim 5 wherein the polyol mixture has an average functionality of from about 1.98 to about 2.4.

8. The polyurethane-forming composition of claim 5 wherein the polyol mixture has an average functionality of from about 1.99 to about 2.3.

9. The polyurethane-forming composition of claim 1 wherein the filler includes at least 50 percent Class F fly ash, by weight of total filler.

10. The polyurethane-forming composition of claim 1 wherein the filler includes at least 75 percent Class F fly ash, by weight of total filler.

11. The polyurethane-forming composition of claim 1 wherein the filler includes at least 90 percent Class F fly ash, by weight of total filler.

12. The polyurethane-forming composition of claim 1 wherein substantially all of the filler is Class F fly ash.

13. The polyurethane-forming composition of claim 1 wherein the filler wetting agent is selected from the group consisting of sodium lauryl sulfate, oleoylsarconsine, cocoamide and triisopropanolamine stearate.

14. A backed carpet having a polyurethane backing that includes at least one coat of polyurethane that is prepared from a polyurethane-forming composition comprising:
   (a) a polyol;
   (b) a chain extender;
   (c) a polyisocyanate;
   (d) a catalyst;
   (e) a filler wetting agent; and
   (f) a filler, wherein the filler includes Class F fly ash.

15. The backed carpet of claim 14 wherein the polyurethane-forming composition additionally includes:
   (1) a surfactant; and
   (2) a blowing agent.

16. The backed carpet of claim 14 wherein the carpet backing includes:
   (a) a polyurethane precoat; and
   (b) a polyurethane laminate coat.

17. The backed carpet of claim 16 wherein the precoat and laminate coat each includes Class F fly ash.

18. The backed carpet of claim 16 wherein the carpet backing additionally includes a polyurethane foam coat.

19. The backed carpet of claim 18 wherein the precoat, laminate coat and foam coat each includes Class F fly ash.

20. The backed carpet of claim 14 wherein the carpet backing includes a polyurethane precoat and a polyurethane foam coat.

21. The backed carpet of claim 20 wherein the foam coat includes Class F fly ash.

22. The backed carpet of claim 20 wherein the precoat and the foam coat each includes Class F fly ash.

23. The backed carpet of claim 14 wherein the filler wetting agent is selected from the group consisting of sodium lauryl sulfate, oleoylsarconsine, cocoamide and tri-isopropanolamine stearate.

24. A polyurethane-forming composition useful for preparing a polyurethane precoat, polyurethane laminate coat, or polyurethane foam coat comprising:

(a) a polyol;

(b) a chain extender;

(c) a polyisocyanate;

(d) a catalyst; and (e) a filler, wherein the filler includes Class F fly ash.

25. A backed carpet having a polyurethane backing that includes at least one coat of polyurethane that is prepared from a polyurethane-forming composition of claim 24.

26. The backed carpet of claim 25 wherein the precoat and laminate coat each includes Class F fly ash.

27. The backed carpet of claim 25 wherein the precoat, laminate coat and foam coat each includes Class F fly ash.

28. A backed carpet having a backing comprised of polyurethane and a filler wherein the filler is comprised of Class F fly ash.

29. The backed carpet of claim 28 wherein the backed carpet includes a precoat and laminate coat.

30. The backed carpet of claim 29 wherein the precoat and/or the laminate coat comprises polyurethane and Class F fly ash.

31. The backed carpet of claim 28 wherein the filler includes at least 90 percent Class F fly ash, by weight of total filler.

32. The backed carpet of claim 31 wherein substantially all of the filler is Class F fly ash.

* * * * *